United States Patent [19]
Bayer et al.

[11] Patent Number: 6,001,396
[45] Date of Patent: Dec. 14, 1999

[54] METHOD AND SOLUTION FOR IMPROVING FROZEN SEAFOOD QUALITY

[75] Inventors: Robert C. Bayer, Orono; Alfred A. Bushway, Veazie; Therese M. Work, Bangor, all of Me.

[73] Assignee: University of Maine, Orono, Me.

[21] Appl. No.: 09/110,739

[22] Filed: Jul. 2, 1998

Related U.S. Application Data

[60] Provisional application No. 60/052,736, Jul. 8, 1997.

[51] Int. Cl.[6] ........................................................ A23L 1/33
[52] U.S. Cl. .............................. 426/2; 426/281; 426/643; 426/652
[58] Field of Search ............................... 426/2, 281, 643, 426/652

[56] References Cited

U.S. PATENT DOCUMENTS

| | | | |
|---|---|---|---|
| 2,563,364 | 8/1951 | Proctor | 426/2 |
| 3,692,545 | 9/1972 | Moore | 426/2 |
| 4,336,274 | 6/1982 | Ross et al. | 426/643 |
| 4,572,838 | 2/1986 | Lanier et al. | 426/643 |
| 5,436,025 | 7/1995 | Rogols et al. | 426/643 |

*Primary Examiner*—Arthur L. Corbin
*Attorney, Agent, or Firm*—Michael J. Persson; William B. Ritchie

[57] ABSTRACT

A method for improving the quality of frozen seafood by enhancing flavor and shelf-life so that the seafood can be stored under commercial conditions. This method includes injection of substances into the flesh or circulatory system of live fish and whole seafood prior to cooking or freezing. These injected substances include antioxidants and cryoprotectants which circulate throughout the tissues, allowing for a uniform distribution throughout the flesh of the animal. The animal is then frozen, or cooked and then frozen, and stored for later use. The present invention is also directed to a solution for injecting into live fish and whole seafood in accordance with the method of the present invention.

11 Claims, No Drawings

METHOD AND SOLUTION FOR IMPROVING FROZEN SEAFOOD QUALITY

This application claims benefit of provisional application No. 60/052,736 filed Jul. 8, 1997.

BACKGROUND OF THE INVENTION

1. Field of the Invention

The present invention relates to flavor and shelf life enhancement of fish and whole seafood prior to cooking or freezing and to the maintenance and enhancement of the cooked yield of fish and whole seafood. In particular, the present invention relates to methods for maintaining or enhancing the flavor, shelf life and cooked yield of Maine lobsters.

2. Description of the Related Art

The quality and taste of seafood is known to deteriorate as oxidation occurs and ice crystals disrupt the cells and tissue. The freezing preservation of whole seafood so that the food tastes substantially like fresh has been so difficult, for example, when compared with the problems associated with freezing meat, that the U.S. Government financed research in this field for many years. Despite this effort, little success has been obtained and the program has now been terminated.

Representative of this type of effort is found in U.S. Pat. No. 4,336,274, issued to Ross et al. on Jun. 22, 1982, which discloses a whole blue crab freezing process. This process includes the use of sugar in the boiling and cooling baths and the retention of this sugar water within the shell of the whole blue crab during freezing and storage. However, only sugar is disclosed as a flavor and shelf life enhancer, and only immersion is disclosed as a method of application. Further, the process is disclosed for whole blue crabs only.

Various attempts have been made in the beef industry to improve the quality of meat. Swift and Codeveloped one of the most promising. In this process, an injection of a clarified, concentrated, standardized proteolytic enzyme (papain) is injected into the animal's jugular vein minutes before slaughter. The size of the injection is dependent upon the weight and grade of the animal. The tenderizing enzyme is carried to all parts of the body through the blood stream and results in a significant increase in tenderness. The purpose of this process was limited to making the meat tenderer and was limited to beef.

A method of improving the quality of frozen seafood, particularly lobsters, which can be used with additives other than sugar and places the additives uniformly into the flesh of the animal prior to cooking or freezing is not disclosed in the prior art.

SUMMARY OF THE INVENTION

The present invention is an injection method for introducing components into the flesh of fish and whole seafood, prior to cooking or freezing, to maintain or enhance flavor, shelf life, and cooked yield. The principle injectants include cryoprotectants, antioxidants and flavor enhancers. In the preferred method of the present invention, these materials are disposed with a liquid to form a solution that is manually or mechanically injected into a live lobster at predetermined points along the body of the lobster such that the solution uniformly perfuses through the tissues of the lobster. It is preferred that between 0.1 and 10 cubic centimeters (c.c.) of solution be injected and that the injected solution have concentrations of between 0.5% and 3% of a cryoprotectant, such as sugar or sugar alcohol, and between 100 and 1000 parts per million (ppm) of an antioxidant, such as a mixed function water dispersible tocopherol.

Therefore, it is an aspect of the invention to provide a method to improve the quality of frozen seafood to prevent any substantial loss of fresh flavor and texture.

It is still another aspect of the invention to provide a method to improve the quality of frozen seafood that yields frozen fish and whole seafood which are as commercially acceptable to the public as the fresh products.

It is still another aspect of the invention to provide a method to improve the quality of frozen seafood that can assure a steady supply of these products regardless of the season.

It is still another aspect of the invention to provide a method to improve the quality of frozen seafood that minimizes the risk of food poisoning.

It is still another aspect of the invention to provide a method of fish and whole seafood preservation, which reduces spoilage in order to conserve these natural resources.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

The invention is an injection method used to inject the food animal while it is still alive. A food additive injection apparatus, as commonly used in the meat processing industry, may be used. This apparatus may consist of a gas, fluid, or manually driven pump which forces additives in solution from a reservoir through a length of tubing and a hollow needle into the flesh to be injected. An alternative method may use a syringe instead of a pump and tubing. Other, alternative methods of injecting liquids into muscle tissue are acceptable. Fresh seafood, preferably lobsters, are injected at various points with antioxidants, cryoprotectants, flavors, or other substances. If fish are selected, injection directly into the flesh at regular intervals is appropriate. In whole seafood, such as lobsters, injection points may include ventral or dorsal sinuses, the heart, and membranes of the tail, the joints or any point, which gives access to the circulatory system. Such injection causes these substances to perfuse uniformly into the tissues. Uniform perfusion has been demonstrated in whole lobsters by dye injection into these locations, followed by observation of the appearance of the dye throughout the crustacean's tissues.

When antioxidants are injected, lipid oxidation is reduced as measured by TBA methodology, giving values in mg/kg malonaldehyde. Antioxidants that may be injected include tocopherols, ethoxyquins, BHT, BHA, TBHG, carotenoids and rentinoids. Cryoprotectants, when injected into fish or whole seafood, enhance flavor as well as texture and shelf life. Antioxidants interact with cryoprotectants to increase shelf life. Cryoprotectants that may be used include sucrose, sorbitol, Xylitol, high fructose corn syrup and corn syrup.

Spices, when injected into fish or whole seafood, also enhance flavor. Additionally, some spices offer antioxidant properties. Spices that may be used include garlic, leeks, cayenne, butter forms, soy sauce, onion, shallots, jalapeno, ginger, teriyaki sauce, spices with antioxidant properties, mace and rosemary.

EXAMPLE

While the examples that are presented use Maine lobsters, those skilled in the art will recognize that any seafood such as blue crabs, rock lobsters, fish, etc. can be utilized. Lobsters of mixed size taken commercially from Maine waters in late October were prepared. Sample treatments included a combination of sucrose and antioxidant at the following levels:

a) 1 g sucrose+2.5 g antioxidant/lobster b) 2 g sucrose+2.5 g antioxidant/lobster c) 3 g sucrose+2.5 g antioxidant/lobster d) Untreated–Control After injection, these lobsters were immobilized by chilling, stacked in layers 2 or 3 lobsters high, and boiled by immersion for 10 minutes. The lobsters were then frozen by immersion in a bath of "Freon 12" liquid gas until boiling stopped. The lobsters were then removed from the Freon bath, hermetically sealed in plastic, and stored in a commercial type of freezer. The samples will be held for up to 15 months under commercial storage practices. Initially and at three-month intervals, the samples are evaluated by a sensory panel and analyzed for chemical and physical characteristics. Moisture and fat content will be analyzed according to AOAC (1190) methods 950.46B and 960.39A, respectively. Salt soluble protein analysis is obtained by using 10 g samples of tissue homogenized with 90 ml of 5% NaCl for 30 seconds. The homogenate is spun for 20 minutes at 20,000 rpm (48,000× g) on a Sorval RC-2-B centrifuge. The supernatant is collected as the salt soluble fraction. The protein content in the soluble fraction is determined by the method of Lowry (91951). Warner Bratzler texture is measured for crusher claws and tail samples (Larmond and Petrasovits, 1972).

Sensory Evaluation—First Results

The samples for initial testing were placed in frozen storage for 12 hours at 4° C. until thawed. Five lobsters of each treatment were prepared. Due to time constraints, the samples were not fully thawed when steamed. Therefore, instead of steaming for 2–3 minutes as is commonly practiced, the samples were steamed for 5 minutes prior to testing. Lobster tails were removed from the shell and cut into 6 pieces, resulting in 30 commingled pieces from each treatment. A trained descriptive sensory panel of nine members was used to evaluate the sweetness, overall and textural attributes of the lobsters using techniques well known in the art. Data was analyzed by multi variant statistical methods using SAS (1991) software.

The results of the initial sensory evaluation tests are shown in Table 1, below.

The sweetness of the control and 1 g sucrose treatment were significantly lower than the 2 and 3 g treatments of sucrose indicating the panelists could detect the difference between the control and 2 g or 3 g samples. When asked to indicate their overall acceptability rating of the samples statistically, no significance difference is reported. The mean scored for overall correspond to "like slightly" for the control and 2 g sucrose and "like moderately" for 1 g and 3 g. The flavor of the 1 g treatment was scored as "bland" when compared to "slightly lobster" for the 2 g and 3 g samples and "moderately lobster" for the control. The texture of the samples can be summarized as "slightly" tender, fibrous and moist.

TABLE 1

Sensory mean scores of control and cryoprotectant lobster treatments

| | Initial Testing | | | |
|---|---|---|---|---|
| Quality | Control | 1 g. sucrose | 2 g. sucrose | 3 g. sucrose |
| Sweetness | 2.3 b | 2.1 b | 3.0 a | 3.3 a |
| Overall | 5.9 a | 6.6 a | 5.8 a | 6.7 a |
| Flavor | 6.0 a | 4.0 b | 5.0 ab | 4.9 ab |
| Tender/Tough | 3.1 b | 4.3 ab | 5.0 a | 4.8 bc |
| Mush/Fibrous | 4.7 a | 5.0 a | 4.9 a | 4.2 a |
| Dry/Moist | 5.7 a | 4.8 bc | 4.4 c | 5.4 ab |

Note: Means followed by similar letters are not significantly different.

Lipid oxidation of rancidity was measured using TBA methodology. The TBA values are reported in Table 2 below. The lower the TBA values the lower the level of oxidation that has occurred in the samples. The analysis indicates a significant correlation between higher sucrose levels and increased antioxidant effect.

TABLE 2

TBA values (mg/kg malonaldehyde) of control and cryoprotectant lobster treatments

| Initial Testing | |
|---|---|
| Treatment | TBA |
| Control | .92 a |
| 1g sucrose | .78 b |
| 2g sucrose | .67 c |
| 3g sucrose | .47 d |

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of improving quality of frozen sea animals comprising the steps of:

obtaining a live sea animal;

injecting said live sea animal with a solution comprising at least one antioxidant and at least one cryoprotectant; and freezing said sea animal.

2. The method as claimed in claim 1 wherein said solution of said injecting step further comprises at least one spice.

3. The method as claimed in claim 2 wherein said solution comprises at least one antioxidant selected from the group consisting of a tocopherol, an ethoxyquin, BHT, BHA, TBHG, a carotenoid, and a retinoid.

4. The method as claimed in claim 2 wherein said solution comprises at least one cryoprotectant selected from the group consisting of sucrose, sorbitol, xylitol, high fructose corn syrup, and corn syrup.

5. The method as claimed in claim 2 wherein said solution comprises at least one spice selected from the group consisting of garlic, leeks, cayenne, butter forms, soy sauce, onions, shallots, jalapenos, ginger, teriyaki sauce, mace, and rosemary.

6. The method as claimed in claim 1 wherein said live sea animal is a lobster.

7. The method as claimed in claim 6 further comprising the step of killing said lobster before performing said freezing step.

8. The method as claimed in claim 6 wherein said step of injecting said live sea animal comprises the step of injecting said lobster such that said solution substantially uniformly perfuses into tissues of said lobster.

9. The method as claimed in claim 8 wherein said step of injecting said live sea animal comprises the step of injecting said lobster at a point selected from the group consisting of a ventral sinus, a dorsal sinus, a heart, a membrane of the tail, and a joint.

10. The method as claimed in claim 1 wherein said solution comprises at least one antioxidant selected from the group consisting of a tocopherol, an ethoxyquin, BHT, BHA, TBHG, a carotenoid, and a retinoid.

11. The method as claimed in claim 1 wherein said solution comprises at least one cryoprotectant selected from the group consisting of sucrose, sorbitol, xylitol, high fructose corn syrup, and corn syrup.

* * * * *